(12) United States Patent
Vasudevan et al.

(10) Patent No.: US 10,803,175 B2
(45) Date of Patent: Oct. 13, 2020

(54) DEVICE ATTESTATION THROUGH SECURITY HARDENED MANAGEMENT AGENT

(71) Applicant: Microsoft Technology Licensing, LLC, Redmond, WA (US)

(72) Inventors: Janani Vasudevan, Redmond, WA (US); Peter David Waxman, Seattle, WA (US); Kinshuman Kinshumann, Redmond, WA (US); Justin A. Hou, Seattle, WA (US); Peter J. Kaufman, Sammamish, WA (US); Yuhang Zhu, Bellevue, WA (US); Giridhar Viswanathan, Redmond, WA (US); Scott R. Shell, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 14/641,184

(22) Filed: Mar. 6, 2015

(65) Prior Publication Data
US 2016/0259941 A1   Sep. 8, 2016

(51) Int. Cl.
*G06F 21/57* (2013.01)
*H04L 29/06* (2006.01)
(Continued)

(52) U.S. Cl.
CPC .......... *G06F 21/575* (2013.01); *G06F 21/572* (2013.01); *G06F 21/602* (2013.01);
(Continued)

(58) Field of Classification Search
CPC ..... G06F 21/575; G06F 21/572; G06F 21/602
See application file for complete search history.

(56) References Cited

U.S. PATENT DOCUMENTS 5,678,041 A * 10/1997 Baker ................... G06F 21/604
8,607,067 B1 * 12/2013 Janse van Rensburg ....................
H04L 63/0823
713/189
(Continued)

FOREIGN PATENT DOCUMENTS

CN   102025765 A   4/2011
CN   102047262 A   5/2011
(Continued)

OTHER PUBLICATIONS

"Trusted Platform Module Library Part 2: Structures", Family "2.0"—Level 00 Revision 01.16, Oct. 30, 2014, 163 pages.
(Continued)

*Primary Examiner* — Jaweed A Abbaszadeh
*Assistant Examiner* — Cheri L Harrington
(74) *Attorney, Agent, or Firm* — Fiala & Weaver P.L.L.C.

(57) ABSTRACT

A device boots in a secure manner that allows measurements reflecting which components are loaded during booting to be generated. Measurements of such components, as well as of a device management agent and the security state of the device, are also obtained. The device management agent accesses an attestation service for an enterprise, which is a collection of resources managed by a management service. The device management agent provides the obtained measurements to the attestation service, which evaluates the measurements and based on the evaluation determines whether the device is verified for use in the enterprise. The management service uses this verification to ensure that the device management agent is running in a secure manner, is accurately providing indications of the state of the device to the management service, and is implementing policy received from the management service.

20 Claims, 4 Drawing Sheets

(51) Int. Cl.
*G06F 21/60* (2013.01)
*H04L 9/32* (2006.01)
(52) U.S. Cl.
CPC ............ *H04L 9/3234* (2013.01); *H04L 63/20* (2013.01); *G06F 2221/033* (2013.01); *H04L 2209/127* (2013.01)

(56) References Cited

U.S. PATENT DOCUMENTS

| | | | |
|---|---|---|---|
| 8,813,179 B1 | 8/2014 | Qureshi | |
| 8,910,264 B2 | 12/2014 | Qureshi | |
| 9,602,288 B1* | 3/2017 | Mikulski | H04L 9/3247 |
| 2006/0200856 A1* | 9/2006 | Salowey | H04L 9/32 726/5 |
| 2007/0245138 A1* | 10/2007 | Camenisch | G06F 21/577 713/156 |
| 2009/0049510 A1* | 2/2009 | Zhang | G06F 21/53 726/1 |
| 2009/0169012 A1* | 7/2009 | Smith | G06F 21/57 380/277 |
| 2009/0204701 A1 | 8/2009 | Herzog et al. | |
| 2009/0300671 A1* | 12/2009 | Scott | H04N 21/4755 725/27 |
| 2011/0131627 A1* | 6/2011 | Abendroth | G06F 21/41 726/1 |
| 2011/0213953 A1* | 9/2011 | Challener | G06F 21/57 713/2 |
| 2012/0023568 A1* | 1/2012 | Cha | G06F 21/335 726/10 |
| 2012/0084850 A1* | 4/2012 | Novak | G06F 21/335 726/8 |
| 2012/0084851 A1* | 4/2012 | Neystadt | G06F 21/335 726/9 |
| 2012/0110644 A1* | 5/2012 | Thom | G06F 21/57 726/4 |
| 2012/0163589 A1* | 6/2012 | Johnson | G06F 21/57 380/30 |
| 2012/0198235 A1* | 8/2012 | Kotla | H04L 9/0861 713/171 |
| 2012/0216242 A1 | 8/2012 | Uner et al. | |
| 2012/0226895 A1* | 9/2012 | Anderson | G06F 21/575 713/2 |
| 2012/0246470 A1* | 9/2012 | Nicolson | G06F 21/57 713/158 |
| 2013/0081104 A1 | 3/2013 | Jung et al. | |
| 2013/0111541 A1* | 5/2013 | Yin | G06F 21/577 726/1 |
| 2014/0006347 A1* | 1/2014 | Qureshi | G06F 21/10 707/621 |
| 2014/0115659 A1 | 4/2014 | Attfield et al. | |
| 2014/0245397 A1 | 8/2014 | Lim et al. | |
| 2014/0248853 A1 | 9/2014 | Shipley | |
| 2014/0281539 A1* | 9/2014 | Faltyn | H04L 63/08 713/168 |
| 2014/0282829 A1 | 9/2014 | Dabbiere et al. | |
| 2014/0310510 A1* | 10/2014 | Potlapally | G06F 9/4401 713/2 |
| 2014/0317413 A1* | 10/2014 | Deutsch | H04L 9/3271 713/176 |
| 2015/0089219 A1* | 3/2015 | Francis | G06F 21/575 713/165 |
| 2015/0089645 A1* | 3/2015 | Vandergeest | G06F 21/54 726/23 |
| 2015/0134942 A1* | 5/2015 | Novak | G06F 21/72 713/2 |
| 2015/0237502 A1* | 8/2015 | Schmidt | H04W 12/10 726/7 |
| 2015/0264021 A1* | 9/2015 | Schulz | H04L 63/0414 713/170 |
| 2016/0112456 A1* | 4/2016 | Pearson | H04L 63/0442 713/170 |
| 2016/0127367 A1* | 5/2016 | Jevans | H04L 63/1433 713/152 |
| 2017/0116395 A1* | 4/2017 | Yamamura | G06F 21/12 |

FOREIGN PATENT DOCUMENTS

| | | |
|---|---|---|
| CN | 102136049 A | 7/2011 |
| CN | 102763111 A | 10/2012 |
| CN | 103716797 A | 4/2014 |
| CN | 103763331 A | 4/2014 |
| CN | 104025108 A | 9/2014 |
| CN | 104335220 A | 2/2015 |
| WO | 2014195122 A1 | 12/2014 |

OTHER PUBLICATIONS

"Trusted Platform Module Library Part 1: Architecture", Family "2.0" Level 00 Revision 01.16, Oct. 30, 2014, 269 pages.
"Trusted Platform Module Library Part 3: Commands", Family "2.0"—Level 00 Revision 01.16, Oct. 30, 2014, 464 pages.
"Trusted Platform Module Library Part 4: Supporting Routines", Family "2.0"—Level 00 Revision 01.16, Oct. 30, 2014, 583 pages.
"International Search Report and Written Opinion Issued in PCT Application No. PCT/US2016/018561", dated May 25, 2016, 12 Pages.
"TCG Specification: TPM 2.0 Mobile Reference Architecture", Retrieved from <<http://www.trustedcomputinggroup.org/wp-content/uploads/TPM-2-0-Mobile-Reference-Architecture-v2-r142-Specification_FINAL2.pdf>22 , Dec. 16, 2014, 53 Pages.
Mcgill, Kathleen N., "Trusted Mobile Devices: Requirements for a Mobile Trusted Platform Module", In Johns Hopkins APL Technical Digest, vol. 32, No. 2, Sep. 2013, pp. 544-554.
"Knox Workspace", Retrieved From: <https://www.samsungknox.com/en/products/knox-workspace/technical> Jan. 28, 2014, 11 pages.
"Securing the Windows 8 Boot Process", Retrieved From: <http://technet.microsoft.com/en-US/windows/dn168167.aspx> Feb. 5, 2015, 4 pages.
"What's Changed in Security Technologies in Windows 8.1", Retrieved From: <https://technet.microsoft.com/en-in/library/dn344918.aspx> Feb. 5, 2015, Aug. 21, 2013, 7 pages.
"Wind River Secure Android Capability", Available at: <http://www.windriver.com/announces/android-solutions/Secure_Android%20Capability_Brief.pdf>, Nov. 2012, 5 pages.
Cheng,"A Security-Enhanced Remote Platform Integrity Attestation Scheme", In Proceedings: In 5th International Conference on Wireless Communications, Networking and Mobile Computing, Sep. 24, 2009, 4 pages.
Dickson,""Hardening" Android: Building Security into the Core of Mobile Devices", Available at: <https://www.isc2cares.org/uploadedFiles/wwwisc2caresorg/Content/Android-Security-Report-FrostSullivan.pdf>, May 2014, 28 pages.
Henderson,"How Mobile Device Management Works", Retrieved From: <http://www.itworld.com/article/2742154/mobile/how-mobile-device-management-works.html> Jan. 28, 2015, May 9, 2011, 9 pages.
"SecondWritten Opinion Issued in PCT Application No. PCT/US2016/018561", dated Jan. 12, 2017, 6 Pages.
"International Preliminary Report on Patentability", Application No. PCT/US2016/018561, dated Apr. 12, 2017, 7 pages.
"First Office Action and Search Report Issued in Chinese Patent Application No. 201680014176.X", dated Dec. 13, 2019, 37 Pages.

* cited by examiner

302 — Securely Boot The Computing Device, Generating One Or More Measurements Reflecting The Modules Loaded On The Computing Device (Including The Device Management Agent) And The Security State Of The Computing Device

304 — Run A Device Management Agent As A Hardened Program On The Computing Device

306 — Communicate With An Attestation Service For Enterprise Verification Of The Device Management Agent As Well As Additional Boot Modules And The Security State Of The Computing Device

308 — The Device Management Agent Enrolls With The Management Service

310 — Device Management Agent Receives And Implements Policy From A Management Service Of The Enterprise, And Provides Indications Of The State Of The Computing Device To The Management Service

312 — Access Resources Of The Enterprise As Permitted By The Management Service

DEVICE ATTESTATION THROUGH SECURITY HARDENED MANAGEMENT AGENT

BACKGROUND

Computing devices have become commonplace in many areas of our lives. Given the number of computing devices available to us and the functionality they provide, it is oftentimes desirable to use computing devices to access other devices or resources in a particular environment, such as a corporate environment. Allowing such accesses while at the same time restricting, based on desires of management of the particular environment, what devices or resources can be accessed remains a difficult task.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a computing device is securely booted, the secure booting including generating one or more measurements reflecting modules or components loaded on the computing device as well as a security state of the computing device. A device management agent is run on the computing device as a hardened program that is protected from having malicious code being injected into the program. An attestation service is communicated with via a network to verify the device management agent for use in an enterprise. The device management agent on the computing device implements, on the computing device, policy received from a management service via the network in response to the attestation service verifying the device management agent for use in the enterprise.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Device attestation through a security hardened management agent is discussed herein. When a computing device boots, the computing device boots in a secure manner that allows measurements reflecting (e.g., measurements identifying or being generated based on) which components or modules are loaded and run during booting to be generated. Measurements of such components or modules, as well as of a device management agent and the security state of the computing device, are also obtained by the measurement system. The device management agent accesses an attestation service for a collection of devices or other resources managed by a management service, the collection being referred to herein as an enterprise. The device management agent provides the measurements from the measurement system to the attestation service, which evaluates the measurements and based on the evaluation determines whether the computing device is verified for use in the enterprise. An indication of this verification can be provided to the management system, such as from the attestation service or via the device management agent.

The device management agent receives and implements policy from the management service, and provides indications of the state of the computing device to the management service. These policies can take various forms, such as indications of settings the computing device is to have (e.g., whether particular debug modes are to be disabled), indications of the manner in which the computing device manages data (e.g., that data stored on the computing device be encrypted), indications of which resources in an enterprise can be accessed, and so forth. Given the verification performed by the attestation service, the management service can be assured that the device management agent is running in a secure manner, and is accurately providing indications of the state of the computing device to the management service and implementing the policy received from the management service.

References are made herein to aspects of key cryptography, including symmetric key cryptography, public key cryptography, symmetric keys, and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that are encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that were signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that are encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key).

Figure 1:
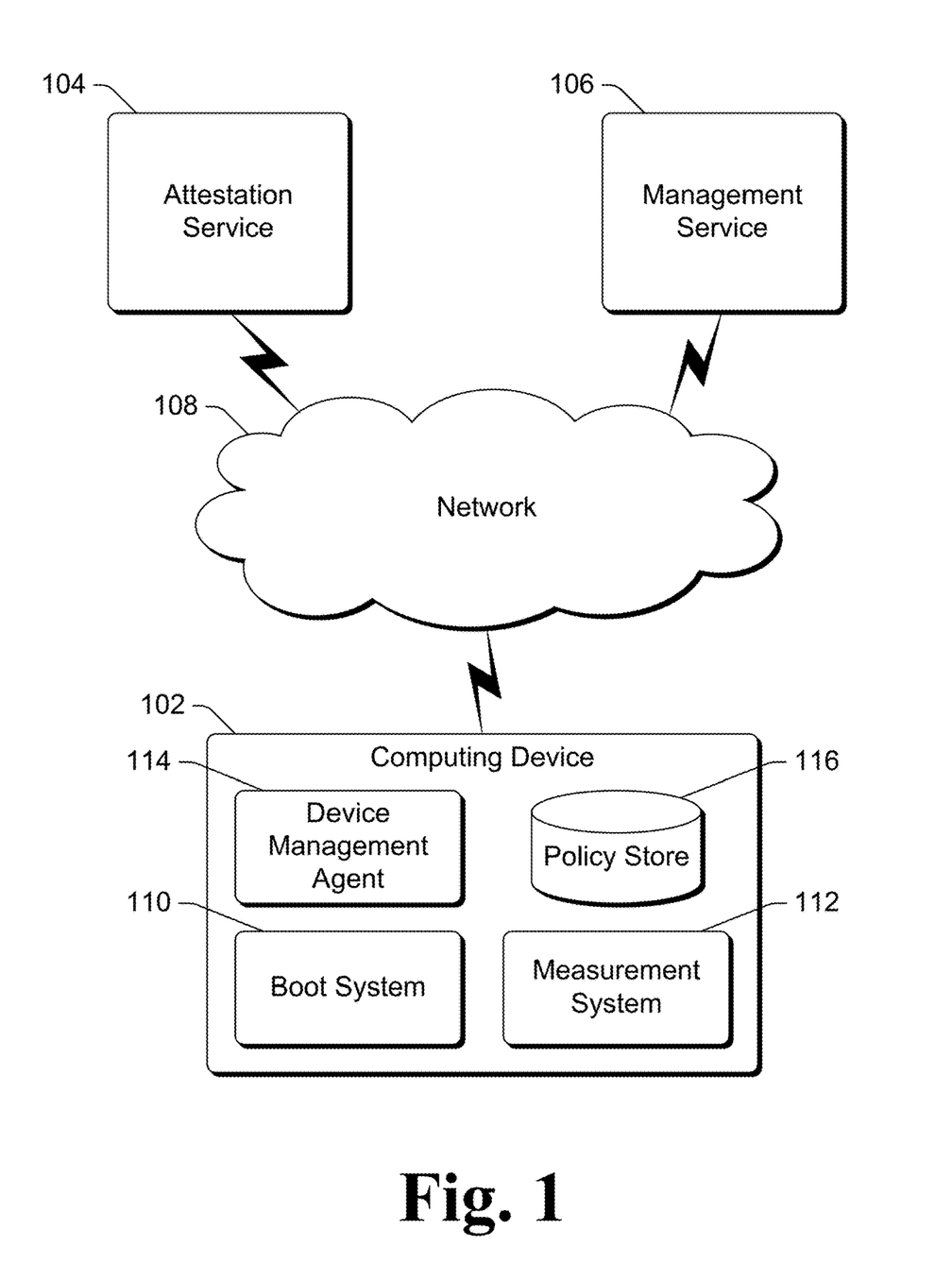
FIG. 1 illustrates an example system implementing the device attestation through security hardened management agent in accordance with one or more embodiments.

FIG. 1 illustrates an example system 100 implementing the device attestation through security hardened management agent in accordance with one or more embodiments. The system 100 includes a computing device 102 that can communicate with an attestation service 104 and a management service 106 via a network 108. The network 108 can be a variety of different networks, including the Internet, a local area network (LAN), a cellular or other phone network, an intranet, other public and/or proprietary networks, combinations thereof, and so forth.

The computing device 102 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, watch), an entertainment device (e.g., an entertainment appliance, a set-top box communicatively coupled to a display device, a game console), a television or other display device, an automotive computer, and so forth. Thus, the computing device 102 may range from a full resource device with substantial memory and processor resources (e.g., personal computers, game consoles) to a low-resource device with limited memory and/or processing resources (e.g., traditional set-top boxes, hand-held game consoles).

The attestation service 104 and the management service 106 are each implemented using one or more computing devices, and each such computing device can be any of a variety of different types of devices. Similar to the discussion of the computing device 102, each computing device implementing at least part of a service 104 or 106 can be a variety of different types of devices, ranging from a full resource device with substantial memory and processor resources to a low-resource device with limited memory and/or processing resources. Although illustrated as two separate services, the attestation service 104 and the management service 106 can alternatively be the same service.

The computing device 102 includes a boot system 110 and a measurement system 112. When the computing device 102 is powered on or otherwise reset, the computing device 102 boots. Booting of the computing device 102 refers to the beginning operation of the computing device 102, typically loading and executing an operating system of the computing device 102. The booting of the computing device 102 includes loading and running various different modules, which in one or more embodiments are various software modules or firmware modules. These modules are illustrated as the boot system 110. These modules can include, for example, a basic input/output system (BIOS), a boot manager, and an operating system (OS) loader as discussed in more detail below. Loading of a module refers to copying the module into a volatile (or alternatively nonvolatile) memory, and optionally performing additional configurations to other modules or data stores. Executing a module refers to the running of (execution of) the instructions of the module by a processor or controller of the computing device 102. After the computing device 102 is booted, various other programs can be run on the computing device 102 by the operating system.

The boot system 110 includes multiple modules that are measured and an indication of the measurement is maintained by the measurement system 112. A measurement of a module refers to an identifier of the module, the identifier changing if the module changes (e.g., if instructions in the module are changed). In one or more embodiments, the measurement of a module is a hash value generated by applying a hash function (e.g., a cryptographic hash function) to the module. The measurement system 112 optionally combines (e.g., hashes together) the measurements of the different modules and provides an indication of the combined measurement. This combined measurement reflects the measurements of the modules included in the boot system 110, and thus also reflects the modules in the boot system 110.

The measurement system 112 also maintains a measurement of a security state of the computing device 102, as represented by a set of security settings or configuration values of the computing device. These security settings can be values of configuration registers of the computing device 102, such as whether secure boot is enabled for the computing device 102, whether certain debug modes are enabled or disabled for the computing device 102, and so forth.

The computing device 102 also includes a device management agent 114. The device management agent 114 communicates with the management service 106, implementing policy provided by the management service 106 and providing indications of various state of the computing device 102. For example, the device management agent 114 can provide to the management service 106 an indication of whether the policies that the device management agent 114 receives from the management service 106 are being enforced on the computing device 102 as discussed in more detail below. The policies implemented by the device management agent 114 are maintained in a policy store 116, as discussed in more detail below. The device management agent 114 is also measured and included in the measurement maintained by the measurement system 112. Although illustrated as separate, the device management agent 114 can also be part of the boot system 110.

The device management agent 114 is also run as a hardened program or process, which refers to the agent 114 being protected from having malicious code being injected into the program or process while running. This protection of the device management agent 114 is discussed in more detail below.

The measurement system 112 generates one or more measurements that reflect the modules in the boot system 110, the device management agent 114, and the security state of the computing device 102. The device management agent 114 provides these one or more measurements to the attestation service 104, which verifies the measurements for use by a group of resources managed by the management service 106, also referred to herein as an enterprise. The management service 106 allows the computing device 102 to access resources managed by the management service 106 if the attestation service 104 verifies the measurements received from the measurement system 112, and takes an appropriate remedial action (such as denying access to the resources managed by the management service 106) if the attestation service 104 does not verify the one or more measurements. The management service 106 can manage access to various resources, such as data, storage devices, printers, and so forth.

The group of resources managed by the management service 106 can take a variety of different forms. In one or more embodiments, the group of resources is a collection of resources in a corporate environment, such as those resources of a particular company or other organization. In order for a computing device to access resources of the corporate environment, the management service 106 requires the computing device to have a device management agent (that can be attested to be secure and not compromised) running on the computing device that enrolls with the management service 106.

Alternatively, the group of resources can take other forms. For example, the group of resources can be a collection of resources (e.g., online servers or other gaming consoles) in a gaming environment. In this example, in order for a computing device to access these resources of the gaming environment, the management service 106 requires the computing device to have a device management agent (that can be attested to be secure and not compromised) running on the computing device that enrolls with the management service 106. By way of another example, the group of resources can be a collection of resources in an educational setting or other setting in which children are using the computing devices. In this example, in order for a computing device to access these resources of the educational or other setting, the management service 106 requires the computing device to have a device management agent (that can be attested to be secure and not compromised) running on the computing device that enrolls with the management service 106. Further following this example, an indication may be included on the computing devices that the computing devices are used by children (e.g., a BIOS setting, register value, module, etc.) and this indication reflected in the one or more measurements. The management service 106 can then allow the computing device to access only resources in the education setting or other setting that are not deemed to be objectionable (e.g., the management service 106 can prevent the computing device from accessing content deemed by the management service 106 to be objectionable). Whether content is deemed objectionable can be determined in various manners, such as based on content source (e.g., a Web site from which the content would be obtained), a rating of the content, other rules or criteria, and so forth.

The techniques discussed herein extend the assurances of securely booting the computing device 102 to management of the computing device by the management service 106, allowing the management service 106 to be assured of various different management operations performed by the device management agent 114. The management service 106 can manage the computing device 102 being assured that the computing device 102 is secure (based on the verification of measurements by the attestation service 104), being assured that the computing device is running the device management agent 114 (and that the device management agent 114 is running in a hardened manner protected against malicious code), and being assured of what policies the management service 106 has provided to the computing device 102 are being enforced. The management service 106 can communicate with the device management agent 114 with an assurance that the device management agent 114 is the program or process expected by the management service 106 rather than malicious code, and thus can rely on the information received from the device management agent 114.

Figure 2:
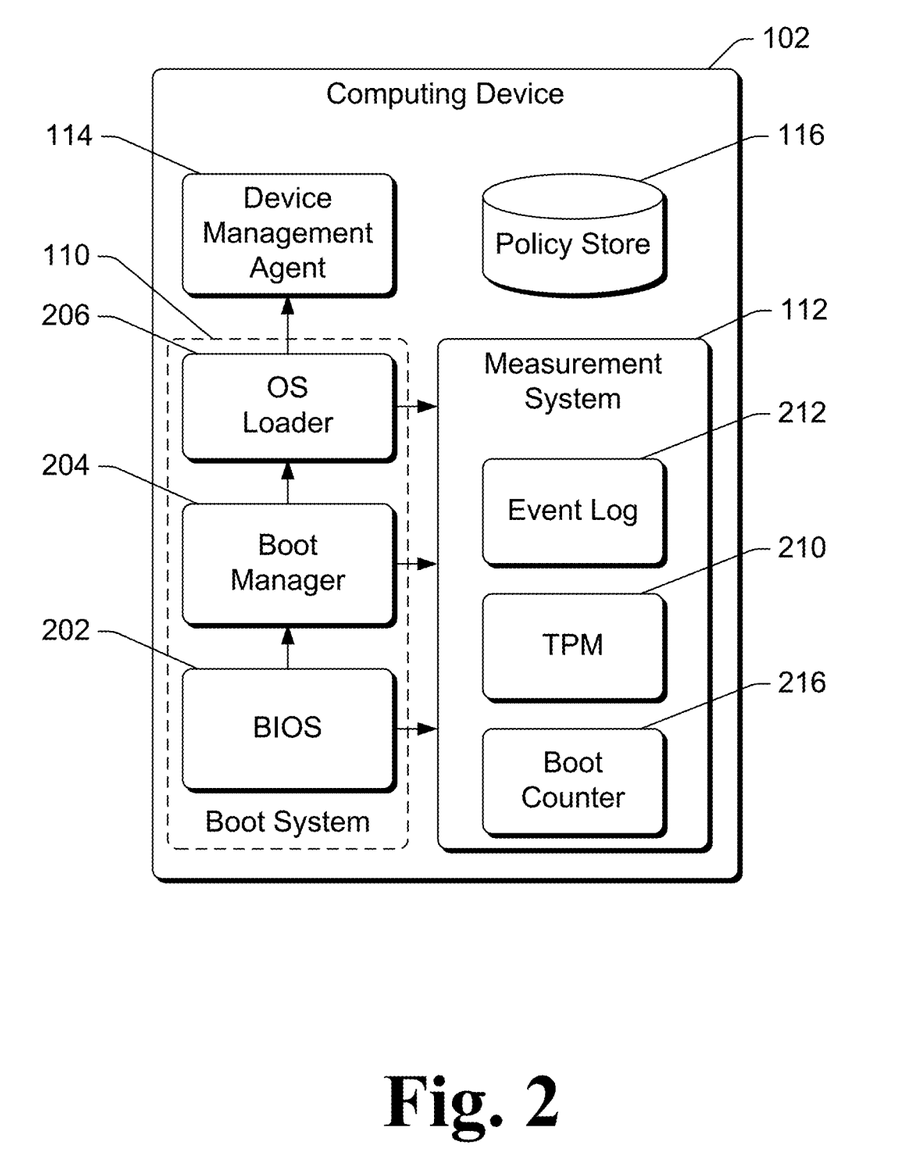
FIG. 2 illustrates the computing device in additional detail in accordance with one or more embodiments.

FIG. 2 illustrates the computing device 102 in additional detail in accordance with one or more embodiments. The computing device 102 includes the boot system 110, the measurement system 112, the device management agent 114, and the policy store 116 as discussed above. The boot system 106 includes a BIOS 202, a boot manager 204, and an OS loader 206, each of which is made up of one or more modules.

The measurement system 112 includes a secure cryptoprocessor that is a trusted platform module (TPM) 210. The TPM 210 includes various functionality, such as key generation, encryption, decryption, secure storage (e.g., platform configuration registers), and so forth. In one or more embodiments, the TPM 210 conforms to the Trusted Computing Group Trusted Platform Module specification version 2.0, published as the Trusted Platform Module Library specification, Family "2.0", Level 00, Revision 01.16 (Oct. 30, 2014), Parts 1-4. Although discussed herein with reference to TPM 210, the measurement system 112 can alternatively use one or more other cryptoprocessors that provide functionality similar to the TPM.

During operation, when booting the computing device 102, multiple modules are loaded and executed. In one or more embodiments, these multiple modules include the device management agent 114. The first module that is loaded generates (or obtains) a measurement of itself and provides the measurement to the measurement system 112. The measurement is loaded into the TPM 210 and is also recorded in an event log 212, which is a file (e.g., a text file) or other record of measurements. It should be noted that the event log 212 can be an unprotected log (e.g., unencrypted and accessible to any module of the computing device 102) that has a copy of all the measurements that go into the TPM.

The first module loaded when booting the computing device 102 also generates a measurement of the next module to be loaded on the computing device 102, provides the measurement to the measurement system 112 (which loads the measurement into the TPM 210 and records the measurement in the event log 212), and transfers control to the next module. This process can be repeated for any number of modules in the boot system 106, with each module generating a measurement of the next module to be loaded on the computing device 102, providing the measurement to the measurement system 112 (which loads the measurement into the TPM 210 and records the measurement in the event log 212), and transferring control to the next module. After all the modules of the boot system 106 are loaded on the computing device 102, the combined measurement in the TPM 210 is an indication of the modules that were loaded and the sequence of the loading of those modules.

The TPM 210 combines the measurements it receives to generate a combined measurement. The measurements can be combined in various different manners, such as by concatenating and hashing the measurements. For example, an initial measurement A received by the TPM 210 can be maintained by the TPM 210. When the next measurement B is received, a combined measurement can be generated by concatenating the initial measurement A and the next measurement B and generating a hash value by applying a one-way function (e.g., a cryptographic hash function) to the concatenated value to generate a combined measurement. When the next measurement C is received, a new combined measurement can be generated by concatenating the previous combined measurement and the next measurement C and generating a hash value by applying a one-way function (e.g., a cryptographic hash function) to the concatenated value to generate a new combined measurement. Alternatively, the TPM 210 can combine the measurements in any of a variety of other manners.

The combined measurement in the TPM 210 can also include an indication of the configuration that affects execution of the modules that were loaded (e.g., boot configuration data (BCD) settings). If the modules that are loaded (and their configurations) and the sequence of the loading of those modules is the same for different boots, then the combined measurements for the different boots will be the same. Each time the computing device 102 is re-booted, the combined measurement in the TPM 210 is expected to have the same value. If the value changes between boots, then it can be assumed that some change to the boot system 106 was made (e.g., a module was not loaded, a module was changed, an additional module was loaded, modules were loaded in a different order, the same modules were loaded but with different configurations, etc.).

The combined measurement in the TPM 210 also includes an indication of the security state of the computing device 102, as represented by a set of security settings (e.g., configuration values) of the computing device 102. These security settings can be values of configuration registers of the TPM 210 or other registers of the computing device 102. Examples of such security settings include whether secure boot is enabled for the computing device 102 (e.g., and thus whether a measurement based on the components of the boot system 110 is generated by the measurement system 112), whether one or more debug modes are enabled or disabled for the computing device 102, whether storage device encryption is enabled or disabled for the computing device 102, and so forth. The measurement system 112 (e.g., the TPM 210) can determine, of various settings of the computing device 102, indications of which of those settings of are included in the combined measurement in the TPM 210. The indication of the security state can be the settings of various registers or other configuration values in the computing device 102, or alternatively a measurement of the settings of various registers or other configuration values in the computing device 102 (e.g., a measurement value generated by applying a cryptographic hash function to the settings of the various registers or other configuration values in the computing device 102).

The measurement system 112 also includes a boot counter 216, which is a monotonic counter that increases each time the computing device 102 is booted. The value of the boot counter 216 can be provided to other services (e.g., the attestation service 104 or the management service 106 of FIG. 1), and used by those services to determine cryptographically that the computing device 102 is reporting the state from that boot.

The following illustrates a more specific example of the booting of the computing device 102. Upon a power up or a reset event, control is passed to the BIOS 202, which performs hardware initialization and eventually proceeds to launch the boot manager 204. However, before the boot manager 204 starts executing, the code of the boot manager is measured by the BIOS 202 and stored in the TPM 210 and the event log 212. The boot manager 204 then executes, decides on what particular operating system to start (in situations in which there are multiple operating systems that could be started), and loads and transfers control to the OS loader 206. However, before passing control to the OS loader 206, the code of the OS loader 206 is measured by the boot manager 204, which provides the measurement to the TPM 210 (which generates a combined measurement) and the event log 212. The OS loader 206 also loads and executes the device management agent 114. The code of the device management agent 114 is measured by the OS loader 206, which provides the measurement to the TPM 210 (which generates a combined measurement) and the event log 212. The OS loader 206 also loads an initial set of operating system modules. Each of those operating system modules is measured by the OS loader 206, which provides the measurements to the TPM 210 (which generates a combined measurement) and the event log 212. The OS loader 206 then passes control to an OS module in one of the security boundaries 110 or 112.

Additionally, upon a power up or a reset event, the boot counter 216 is incremented. The boot counter 216 can be incremented by the BIOS 202, boot manager 204, OS loader 206, or other module of the boot system 110. Alternatively, the boot counter 216 may include or have associated therewith dedicated circuitry or logic that automatically increments the boot counter 216 in response to a power up or a reset event.

Additionally, at some point during booting of the computing device 102, an indication of the security state of the computing device 102 is included in the combined measurement generated by the TPM 210. In one or more embodiments, the indication of the security state is provided to the TPM 210 by the device management agent 114 or the OS loader 206, although the indication can alternatively be provided by other modules.

In the discussions herein, reference is made to the TPM 210 generating a single combined measurement value. In one or more embodiments, the combined measurement value is a combination of the measurements of the components or modules loaded by the boot system 110 as well as the indications of the security state of the computing device 102. Alternatively, rather than generating a single combined measurement value, multiple measurement values may be generated. For example, one measurement value can be generated that is a combination of the measurements of the components or modules loaded by the boot system 110, and another measurement value can be generated that is the indications of the security state of the computing device 102. By way of another example, a separate measurement value may be maintained by the TPM 210 for each component or module loaded by the boot system 110 (rather than a combined measurement value).

Figure 3:
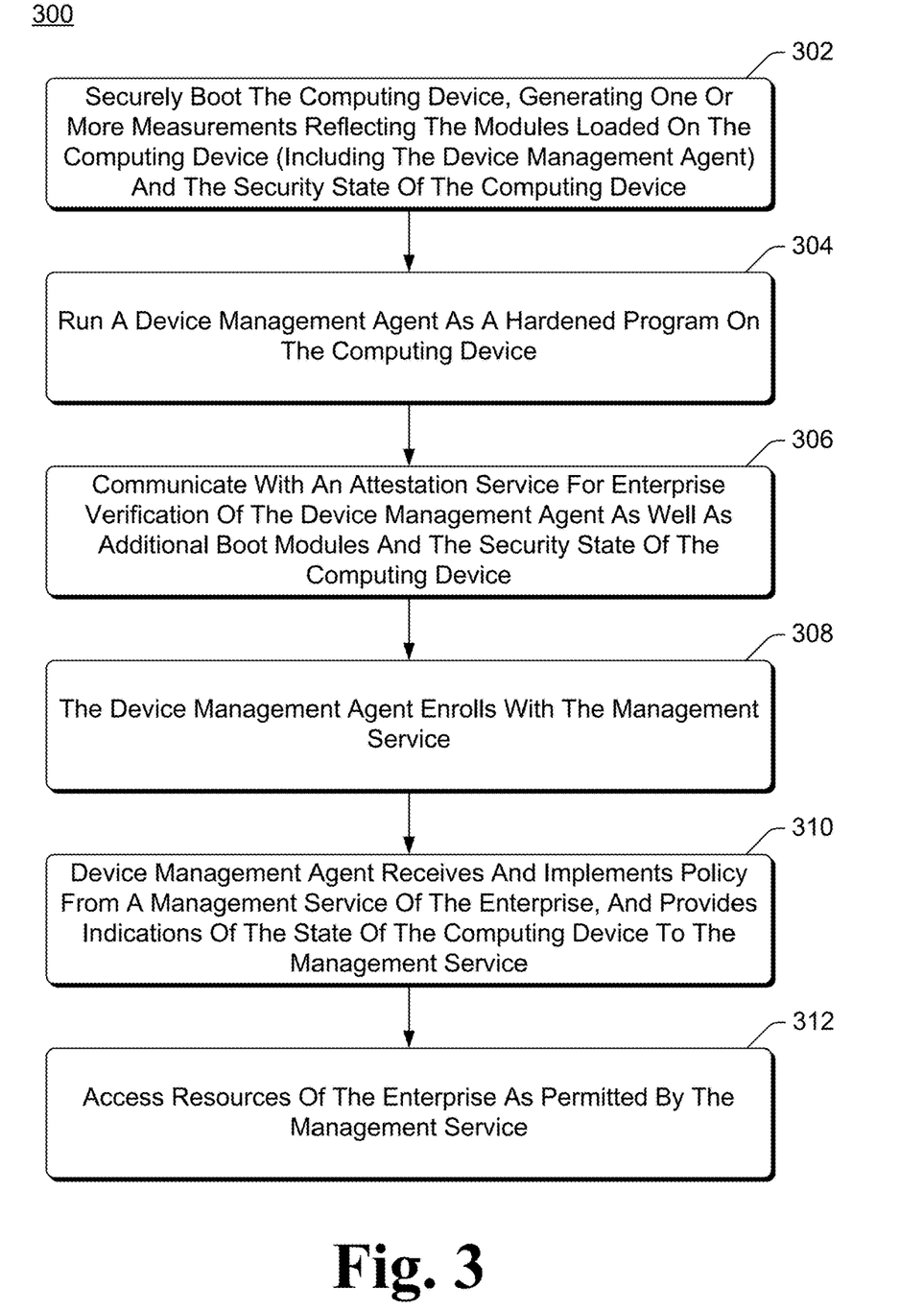
FIG. 3 is a flowchart illustrating an example process for implementing the device attestation through security hardened management agent in accordance with one or more embodiments.

FIG. 3 is a flowchart illustrating an example process 300 for implementing the device attestation through security hardened management agent in accordance with one or more embodiments. Process 300 is carried out by a device, such as computing device 102 of FIG. 1 or 2, and can be implemented in software, firmware, hardware, or combinations thereof. Process 300 is shown as a set of acts and is not limited to the order shown for performing the operations of the various acts. Process 300 is an example process for implementing the device attestation through security hardened management agent; additional discussions of implementing the device attestation through security hardened management agent are included herein with reference to different figures.

In process 300, the computing device is securely booted (act 302). This secure booting includes generating one or more measurements reflecting the modules or components loaded on the computing device, including the device management agent, as well as the security state of the computing device as discussed above. These one or more measurements are maintained by, for example, the TPM of the measurement system.

A device management agent is run as a hardened program on the computing device (act 304). Running the device management agent as a hardened program refers to the device management agent being protected from having malicious code being injected into the program (or process of the program) while running. The device management agent can be run as a hardened program in a variety of different manners.

In one or more embodiments, the device management agent is run as a hardened program by being run as a protected process by the operating system. The device management agent is digitally signed by an operating system private key, and the operating system public key is identified by an operating system certificate (e.g., a certificate of a particular operating system, or manufacturer or distributor of an operating system). The operating system loads and runs the device management agent only if the operating system can verify the digital signature (and thus verify that the device management agent was not tampered with since being digitally signed). The operating system further supports running of such digitally signed programs in a secure mode in which the operating system prevents other running processes from accessing the memory space assigned to the program, thereby preventing malicious processes from injecting code into the running program. The operating system can prevent all other processes from accessing the memory space assigned to the program. Alternatively, the operating system can prevent only other processes that are not also digitally signed by the operating system certificate from accessing the memory space assigned to the program.

The device management agent also communicates with an attestation service for enterprise verification of the device management agent (act 306). The enterprise verification refers to the computing device being verified for use in the enterprise or other group of resources managed by the management service. In act 306, the device management agent provides the one or more measurements generated in act 302 to the attestation service (measurements reflecting the modules or components loaded on the computing device, including the device management agent, as well as the security state of the computing device). The attestation service, in turn verifies the one or more measurements. The attestation service thus also verifies the device management agent, as well as the additional boot modules of the computing device (e.g., modules of the boot system 110) and the security state of the computing device. The boot counter, if not included as one of the one or more measurements, is also provided to the attestation service in act 302.

The attestation service can verify the one or more measurements in a variety of different manners. In one or more embodiments, the attestation service is pre-configured with or otherwise has access to a record of one or more acceptable measurements. If the one or more measurements received from the device management agent are included in the record of acceptable measurements, then the computing device is verified for use in the enterprise or other group of resources managed by the management service. However, if the one or more measurements received from the device management agent are not included in the record of acceptable measurements, then the computing device is not verified for use in the enterprise or other group of resources managed by the management service. For example, if the device management agent has been tampered with, the one or more measurements (which reflect a measurement of the device management agent) that are received from the device management agent will not be included in the record of acceptable measurements, and the computing device (having a tampered-with device management agent) is not verified for use in the enterprise or other group of resources managed by the management service.

Alternatively, the attestation service can verify the one or more measurements in manners other than through a record of acceptable measurements. For example, one or more rules or algorithms can be applied to the received one or more measurements to determine whether the computing device is verified or not verified for use in the enterprise or other group of resources managed by the management service.

In one or more embodiments, the attestation service also records the one or more measurements as well as the boot counter. This allows other enterprise services, such as the management service 106 of FIG. 1, to verify that a current boot session of the computing device is the same boot session of the device as was previously attested to. For example, an additional service in the enterprise can obtain the current boot counter value from the computing device, and also obtain the boot counter value from the attestation service. If the two boot counter values are the same, then the additional service is assured that the current boot session of the computing device is the boot session that was verified by the attestation service.

Additionally or alternatively, the attestation service can return an attestation state to the computing device. The attestation state includes an indication of whether the computing device is healthy and not compromised (e.g., whether the computing device is verified by the attestation service), and optionally includes the boot counter value. The attestation state can also optionally include the one or more measurements used by the attestation service in determining whether the computing device is verified for use in the group of resources managed by the management service. The device management agent maintains a record of the attestation state, and can provide the attestation state to other services in the enterprise (e.g., the management service) as desired to prove to such other services that the computing device is healthy and not compromised. The recorded attestation state can also optionally be used by other programs on the computing device. For example, a program running on the computing device (e.g., a banking application or other application accessing sensitive or confidential data) can access the attestation state and verify that the computing device is healthy and not compromised in order to allow the program to continue running, in order for the program to access a service of the enterprise, and so forth.

The attestation state can be encrypted or otherwise protected in a variety of different manners. In one or more embodiments, the attestation state is encrypted using a key (e.g., a symmetric key or a public key) of the enterprise. The attestation service and other services in the enterprise have knowledge of the key, and can readily decrypt the attestation state. Alternatively, the attestation state is stored encrypted using a key (e.g., a symmetric key or a public key) of the device management agent. The device management agent can readily decrypt the attestation state, and provide the decrypted attestation state to other services in the enterprise as desired. The attestation state can also optionally be digitally signed using a private key of the attestation service, allowing other services in the enterprise to verify that the attestation state has not been altered since being digitally signed by the attestation service.

Additionally or alternatively, the device management agent can derive a key from the attestation state using any of a variety of public and/or proprietary techniques (e.g., by generating a cryptographic hash of the attestation state). The device management agent can then use this attestation state derived key to encrypt data on the computing device. Such data can then be subsequently decrypted only if the computing device still has the same attestation state. This attestation state derived key can be used to secure data across boots of the computing device (in situations in which the attestation state does not include the boot counter), allowing the device management agent to obtain the attestation state from the attestation service, derive the key, and encrypt data. When the device is subsequently rebooted, the device management agent again obtains the attestation state from the attestation service, derives the key, and is able to decrypt the data encrypted prior to rebooting only if the attestation state prior to rebooting and after rebooting is the same.

The device management agent can communicate with the attestation service for enterprise verification of the device management agent in act 306 at various different times. In one or more embodiments, the device management agent communicates with the attestation service for enterprise verification of the device management agent at the end of the boot process (e.g., after the device management agent is running as a hardened program in act 304). Alternatively, the device management agent can communicate with the attestation service for enterprise verification of the device management agent at other times, such as in response to a request by the device management agent to access a resource of the enterprise, in response to the computing device including the device management agent being coupled to a network of the enterprise (e.g., logging into a wired or wireless network), in response to a management service indicating attestation is needed, in response to another program on the computing device indicating attestation is needed, and so forth.

The device management agent enrolls with the management service (act 308). Enrollment with the management service refers to the device management agent requesting enrollment with the management service, and the management service confirming whether the computing device is verified for use in the group of resources managed by the management service. This confirmation can be performed based on an indication of the verification performed by the attestation service in act 306 being received from the attestation service or from the device management agent. Once enrolled with the management service, the device management agent can access resources of the enterprise, as permitted by the management service as discussed in more detail below. Although illustrated as two separate acts 306 and 308, alternatively the attestation service and the management service can be implemented as a single service, and the attestation of act 306 and the enrollment of act 308 can be performed as part of the same act.

In one or more embodiments, in situations in which the computing device is not verified for use in the group of resources managed by the management service, one or more of various remedial actions are taken by the management service. One such remedial action is that the management service does not enroll the computing device. Another remedial action that can be taken is to remove an identification of the computing device from an approved list of devices maintained by the management service (e.g., a whitelist of devices, as discussed in more detail below). Another remedial action that can be taken is to send an command or other indication to the computing device (e.g., the device management agent on the computing device, or the TPM on the computing device) to delete at least the private keys of the TPM (and thus effectively rendering the computing device unusable for any purpose relying on encryption or security by the TPM). Other remedial actions can additionally or alternatively be taken, such as providing an indication to the attestation service that the computing device is not enrolled in the management service.

Once enrolled, the device management agent also receives and implements policy from a management service, and provides indications of the state of the computing device to the management service (act 310). The policy identifies various different settings, configurations, or manners of operation for the computing device in order for the computing device to access resources of the enterprise. The device management agent also provides indications of the state of the computing device to the management service. These indications include, for example, indications that particular policies are being complied with by the computing device.

The management service trusts the indications regarding the state of the computing device that it receives from the device management agent. The management service trusts these indications because the computing device has been securely booted and the device management agent has been verified by the attestation service.

In one or more embodiments, the device management agent receives the policies in an encrypted manner (e.g., encrypted using a public key of the device management agent) and/or in a digitally signed manner (e.g., digitally signed using a private key of the management service).

Policies received by the device management agent are stored in the policy store of the computing device (e.g., the policy store 116 of FIG. 1 or FIG. 2). The policies are stored in a secure manner, protecting the policies from being altered by malicious code on the computing device 102. The policies can be stored in a secure manner using any of a variety of different techniques. In one or more embodiments, the policies are encrypted by the device management agent using the public key of a public/private key pair of a security processor of the computing device (e.g., of the TPM 210). The device management agent is able to retrieve and decrypt the policies using the private key of the device management agent public/private key pair, but malicious code does not have the private key and thus is not able to decrypt the policies.

The policies received from the management service are also optionally digitally signed by the management service. The device management agent verifies the digital signatures on the policies, and adds the policies to the policy store only if the digital signatures are verified.

Alternatively, the policies can be stored in different manners. For example, the policy store can be implemented in hardware, and accessible only to the device management agent. The operating system, or the hardware itself, can control write access to the policy store so that only the device management agent is able to write policy to the policy store. Malicious code is thus not able to access or change the policies in the policy store. Various programs, including the device management agent, can read the policies from the policy store, but the policies can be digitally signed by the device management agent, allowing any change to a policy or attempt to provide a false policy by malicious code to be detected.

The computing device implementing the process 300 is then able to access resources of the enterprise as permitted by the management service (act 312). The management service can permit or deny access to various resources based on the indications of the state of the computing device provided to the management service in act 310. For example, the management service may not allow the computing device to access a particular file or storage device unless the indications of the state of the computing device represent that the computing device's storage device is encrypted. The management service can also permit or deny access to various resources based on the current boot counter value of the device. For example, the management service may allow the computing device to access a particular file or storage device only if the current value of the boot counter of the device is the same as the boot counter value that was provided to the attestation service in act 306.

Access to a resource can be permitted or denied in a variety of different manners. In one or more embodiments, the management service operates as an account login manager for an enterprise. The management service can permit access by allowing the computing device to login to the enterprise, and deny access by preventing the computing device from logging into the enterprise. Alternatively, the management service maintains information that is needed to access the resource, such as keys, resource identifiers (e.g., uniform resource identifiers), and so forth. The management service can permit access by providing such information to the computing device, and deny access by refusing to provide such information to the computing device.

In one or more embodiments, the computing device has an associated endorsement key that is assigned to the computing device so that the computing device can be distinguished from other computing devices (e.g., the endorsement key is unique to the computing device). In one or more embodiments, this endorsement key is a TPM endorsement key that is assigned to the TPM (e.g., the TPM 210 of FIG. 2) at the time that the computing device (or at least the measurement system) is manufactured. The TPM endorsement key is included as part of the TPM, protecting the TPM endorsement key from being modified by malicious code on the computing device. Additionally, a certificate that is digitally signed by a trusted entity (e.g., a third party trusted by the management service) and that attests to the TPM endorsement key for the computing device is assigned to the TPM (e.g., at the time that the computing device, or at least the measurement system is manufactured). This certificate can be provided by the computing device to the management service, serving as proof to the management system that the computing device is indeed the computing device it claims to be.

In one or more embodiments, one or both of the attestation service 104 and the management service 106 of FIG. 1 maintains an approved list of devices (e.g., a whitelist of devices). A computing device is identified, for example, by the TPM endorsement key of the computing device. The services 104 and/or 106 can be pre-configured with the approved list of devices, or alternatively can obtain the approved list of devices from other services, devices, or other sources. In situations in which the attestation service 104 maintains an approved list of devices, the attestation service verifies the computing device for use in the enterprise or other group of resources managed by the management service in act 306 only if the computing device is on the approved list of devices (e.g., as indicated by the certificate attesting to the TPM endorsement key of the computing device). In situations in which the management service 106 maintains an approved list of devices, the management service allows the computing device to access resources of the enterprise managed by the management service in act 312 only if the computing device is on the approved list of devices (e.g., as indicated by the certificate attesting to the TPM endorsement key of the computing device).

Furthermore, the TPM endorsement key can be used to digitally sign indications of the state of the computing device (or any other information) provided by the device management agent to the management service (e.g., in act 310 or 312). This allows the management service to verify that the indications or other information is being received from the computing device from which the management service is expecting to receive the indications or other information. Thus, the TPM endorsement key can be used to identify the computing device as well as know whether the computing device is healthy and not compromised.

In one or more embodiments, an additional trust is established between hardware components of the computing device and the TPM (e.g., the TPM 210 of FIG. 2). These additional hardware components can be, for example, a camera, a microphone, a storage device, and so forth. This additional trust can be established prior to booting a computing device, such as during the manufacturing of the computing device. This additional trust can be established in different manners, such as by providing a value associated with the hardware component (e.g., an identifier of the hardware component) to the TPM. This provides an additional level of trust for the management service (or other services of the enterprise) because the device management agent can attest that the hardware component is trusted by the TPM, and thus that settings for the hardware component (e.g., to turn off a microphone, to turn off a camera, etc.) are actually carried out by the hardware component. The device management agent can optionally obtain from the hardware component the value associated with the hardware component, and verify that the obtained value is the same as was previously provided to the TPM in order to attest that the hardware component is trusted by the TPM.

Thus, using the techniques discussed herein, the computing device can be trusted by the management service to be secure when accessing resources of the enterprise. As discussed above, the computing device is securely booted, with the components loaded as part of the boot system and the security information of the computing device, including the device management agent, being measured by the TPM. The verification of the TPM measurement by the attestation service ensures that a trusted device management agent is running on the computing device. The device management agent, being trusted, is trusted by the management service to access and store policy received from the management service in a secure manner. This allows the management service to trust that the policy desired by the management service to be enforced on the computing device in order to access enterprise resource managed by the management service is actually being enforced on the computing device. The security of the boot process on the computing device is thus effectively extended to the management service, allowing the management service to determine whether a desired device management agent is running on and the desired policy is implemented on the computing device before allowing the computing device to access resources of the enterprise.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 4:
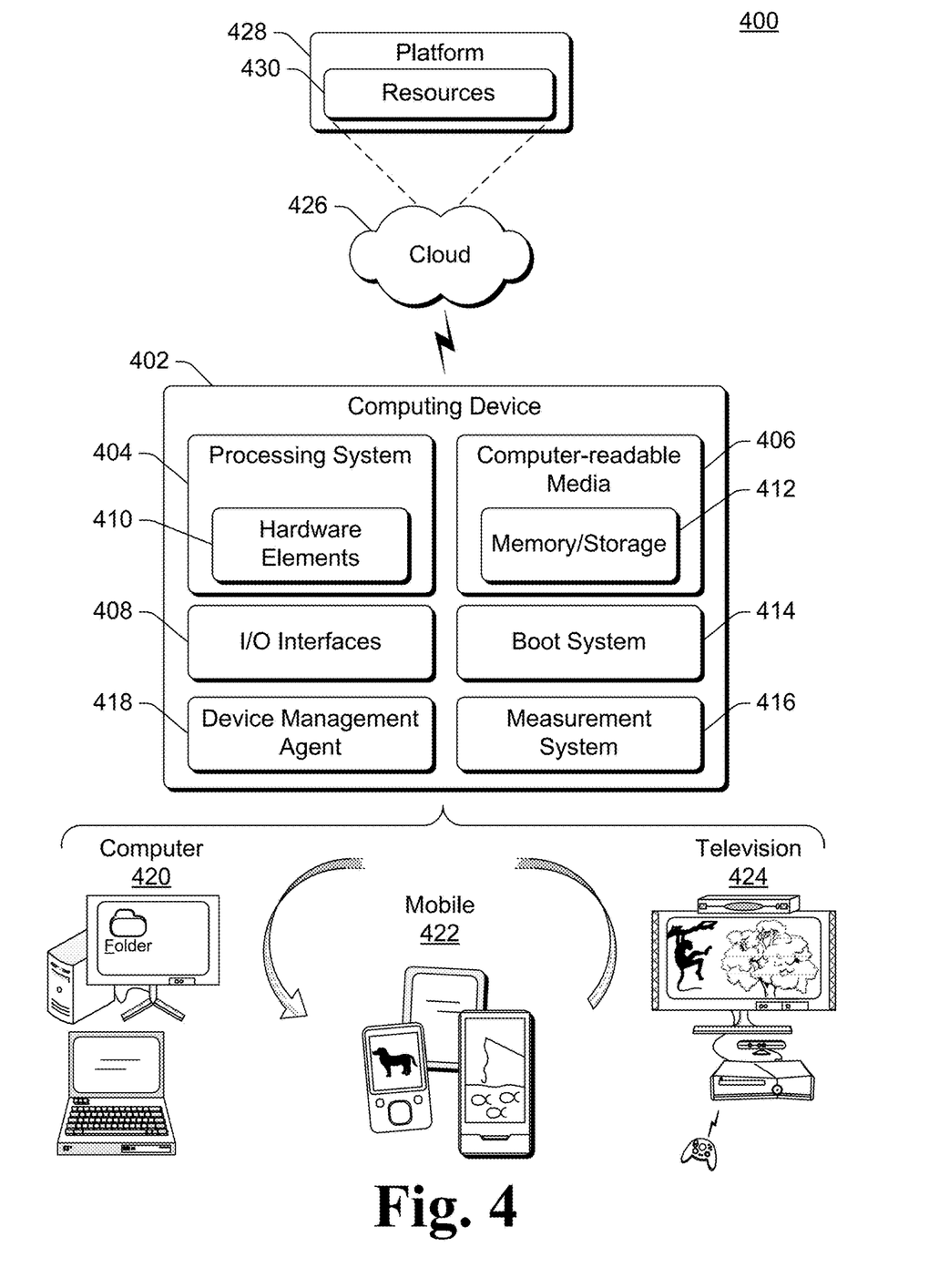
FIG. 4 illustrates an example system that includes an example computing device that is representative of one or more systems and/or devices that may implement the various techniques described herein.

FIG. 4 illustrates an example system generally at 400 that includes an example computing device 402 that is representative of one or more systems and/or devices that may implement the various techniques described herein. The computing device 402 may be, for example, a server of a service provider, a device associated with a client (e.g., a client device), an on-chip system, and/or any other suitable computing device or computing system.

The example computing device 402 as illustrated includes a processing system 404, one or more computer-readable media 406, and one or more I/O Interfaces 408 that are communicatively coupled, one to another. Although not shown, the computing device 402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 404 is representative of functionality to perform one or more operations using hardware. Accordingly, the processing system 404 is illustrated as including hardware elements 410 that may be configured as processors, functional blocks, and so forth. This may include implementation in hardware as an application specific integrated circuit or other logic device formed using one or more semiconductors. The hardware elements 410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 406 is illustrated as including memory/storage 412. The memory/storage 412 represents memory/storage capacity associated with one or more computer-readable media. The memory/storage 412 may include volatile media (such as random access memory (RAM)) and/or nonvolatile media (such as read only memory (ROM), Flash memory, optical disks, magnetic disks, and so forth). The memory/storage 412 may include fixed media (e.g., RAM, ROM, a fixed hard drive, and so on) as well as removable media (e.g., Flash memory, a removable hard drive, an optical disc, and so forth). The computer-readable media 406 may be configured in a variety of other ways as further described below.

The one or more input/output interface(s) 408 are representative of functionality to allow a user to enter commands and information to computing device 402, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 402 may be configured in a variety of ways as further described below to support user interaction.

The computing device 402 also includes a boot system 414, a measurement system 416, and a device management agent 418. The boot system 414, measurement system 416, and device management agent 418 provide various functionality discussed herein, including generating and maintaining measurements of modules of the boot system 414 and of the device management agent 418, communicating with an attestation service and management service, and so forth as discussed above. The boot system 414, the measurement system 416, and the device management agent 418 can implement, for example, the boot system 110, the measurement system 112, and the device management agent 114, respectively, of FIGS. 1 and 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 402. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 410 and computer-readable media 406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 410. The computing device 402 may be configured to implement particular instructions and/or functions corresponding to the software and/or hardware modules. Accordingly, implementation of modules as a module that is executable by the computing device 402 as software may be achieved at least partially in hardware, e.g., through use of computer-readable storage media and/or hardware elements 410 of the processing system. The instructions and/or functions may be executable/operable by one or more articles of manufacture (for example, one or more computing devices 402 and/or processing systems 404) to implement techniques, modules, and examples described herein.

As further illustrated in FIG. 4, the example system 400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 400, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 402 may assume a variety of different configurations, such as for computer 420, mobile 422, and television 424 uses. Each of these configurations includes devices that may have generally different constructs and capabilities, and thus the computing device 402 may be configured according to one or more of the different device classes. For instance, the computing device 402 may be implemented as the computer 420 class of a device that includes a personal computer, desktop computer, a multi-screen computer, laptop computer, netbook, and so on.

The computing device 402 may also be implemented as the mobile 422 class of device that includes mobile devices, such as a mobile phone, portable music player, portable gaming device, a tablet computer, a multi-screen computer, and so on. The computing device 402 may also be implemented as the television 424 class of device that includes devices having or connected to generally larger screens in casual viewing environments. These devices include televisions, set-top boxes, gaming consoles, and so on.

The techniques described herein may be supported by these various configurations of the computing device 402 and are not limited to the specific examples of the techniques described herein. This functionality may also be implemented all or in part through use of a distributed system, such as over a "cloud" 426 via a platform 428 as described below.

The cloud 426 includes and/or is representative of a platform 428 for resources 430. The platform 428 abstracts underlying functionality of hardware (e.g., servers) and software resources of the cloud 426. The resources 430 may include applications and/or data that can be utilized while computer processing is executed on servers that are remote from the computing device 402. Resources 430 can also include services provided over the Internet and/or through a subscriber network, such as a cellular or Wi-Fi network.

The platform 428 may abstract resources and functions to connect the computing device 402 with other computing devices. The platform 428 may also serve to abstract scaling of resources to provide a corresponding level of scale to encountered demand for the resources 430 that are implemented via the platform 428. Accordingly, in an interconnected device embodiment, implementation of functionality described herein may be distributed throughout the system 400. For example, the functionality may be implemented in part on the computing device 402 as well as via the platform 428 that abstracts the functionality of the cloud 426.

In the discussions herein, various different embodiments are described. It is to be appreciated and understood that each embodiment described herein can be used on its own or in connection with one or more other embodiments described herein. Any of the devices, methods, and so forth discussed herein can be used in conjunction with any other devices, methods, and so forth discussed herein. Further aspects of the techniques discussed herein relate to one or more of the following embodiments.

A method implemented in a computing device, the method comprising: securely booting the computing device, the securely booting including generating one or more measurements reflecting modules or components loaded on the computing device and a security state of the computing device; running a device management agent on the computing device as a hardened program that is protected from having malicious code being injected into the program; communicating, via a network, with an attestation service to verify the device management agent for use in an enterprise; and implementing, on the computing device by the device management agent, policy received from a management service via the network in response to the attestation service verifying the device management agent for use in the enterprise, the verification being an assurance to the management service that the device management agent is secure and is not compromised.

Alternatively or in addition to any of the above described methods, any one or combination of: the method further comprising accessing resources of the enterprise as permitted by the management service; the method further comprising providing to the management service an indication of one or more policies that are being complied with by the computing device, access to the resources of the enterprise being permitted by the management service based at least in part on which policies are being complied with by the computing device; the method further comprising providing to the management service an indication of a trusted platform module endorsement key of the computing device, and being permitted to access resources of the enterprise only in response to the trusted platform module endorsement key of the computing device being included in an approved list of devices of the management service; the method further comprising incrementing, each time the computing device is booted a boot counter that is a monotonic counter, providing a current value of the boot counter to the attestation service, and providing the current value of the boot counter to the management service, allowing the management service to verify the value of the boot counter provided to the attestation service is the same as the value of the boot counter provided to the management service; the implementing including implementing, by the device management agent, policy received via the network only if the received policy is digitally signed by the management service; the method further comprising storing the received policy that is digitally signed by the management service in a hardware policy store of the computing device; the method further comprising the device management agent digitally signing the policy received from the management service and storing the digitally signed policy in a policy store of the computing device; the method further comprising receiving, from the attestation service, an attestation state for the computing device, the attestation state including an indication of whether the computing device is verified by the attestation service as well as at least one of the one or more measurements, and providing the attestation state to one or more additional services in the enterprise to prove to the one or more additional services that the computing device has been verified for use in the enterprise by the attestation service; the method further comprising deriving, by the device management agent, a key from the attestation state, and encrypting data on the computing device using the key derived from the attestation state; the one or more measurements reflecting the device management agent; the method further comprising obtaining, by the device management agent, a value associated with a hardware component of the computing device, verifying that the obtained value is the same value as was previously provided to a trusted platform module of the computing device, and attesting to the management service that the hardware component is trusted by the trusted platform module in response to the obtained value being the same as was previously provided to the trusted platform module; the method further comprising, providing to the management service an enrollment request, and receiving an indication that the computing device is enrolled with the management service in response to the attestation service having verified the device management agent for use in the enterprise, the management service taking a remedial action in response to the attestation service not having verified the device management agent for use in the enterprise.

A computing device comprising: a policy store; a measurement system including a trusted platform module; a boot system configured to securely boot the computing device, the securely booting including generating and providing, to the measurement system, one or more measurements reflecting modules or components loaded on the computing device and a security state of the computing device; and a device management agent configured to run on the computing device as a hardened program that is protected from having malicious code being injected into the program, communicate via a network with an attestation service to verify the device management agent for use in an enterprise, maintain policy received from a management system via the network in the policy store, and implement the policy on the computing device, the verification being an assurance to the management service that the device management agent is secure and is not compromised.

Alternatively or in addition to any of the above described computing devices, any one or combination of: the policy store comprising a hardware policy store that can be written to by the device management agent but not by other programs running on the computing device; the one or more measurements reflecting the device management agent; the measurement system being further configured to increment, each time the computing device is booted, a boot counter that is a monotonic counter, the device management agent being further configured to provide a current value of the boot counter to the attestation service, and provide the current value of the boot counter to the management service, allowing the management service to verify the value of the boot counter provided to the attestation service is the same as the value of the boot counter provided to the management service.

A computing device comprising: one or more processors; and one or more computer-readable storage media having stored thereon multiple instructions that, when executed by the one or more processors, cause the one or more processors to perform acts including: securely booting the computing device, the securely booting including generating one or more measurements reflecting modules or components loaded on the computing device and a security state of the computing device; running a device management agent on the computing device as a hardened program that is protected from having malicious code being injected into the program; communicating, via a network, with an attestation service to verify the device management agent for use in an enterprise; and implementing, on the computing device by the device management agent, policy received from a management service via the network in response to the attestation service verifying the device management agent for use in the enterprise.

Alternatively or in addition to any of the above described computing devices, any one or combination of: the acts further including accessing resources of the enterprise as permitted by the management service; the one or more measurements further reflecting an indication that the computing device is used by one or more children, and the acts further including providing to the management service an enrollment request, and receiving an indication that the computing device is enrolled with the management service in response to the attestation service having verified the device management agent for use in the enterprise, the management service preventing the computing device from accessing content deemed objectionable by the management service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a device management agent as a hardened program executing on a computing device, the method comprising:
   accessing, following a first secured boot of the computing device, a first measurement associated with the first secured boot;
   providing the first measurement to an attestation service;
   receiving, from the attestation service, a first attestation state associated with the first measurement, the first attestation state an indication the device management agent is secure;
   deriving a first key from the first attestation state;
   encrypting data using the first key;
   storing the encrypted data on the computing device;
   accessing, following a first secured reboot of the computing device, a second measurement associated with the first secured reboot;
   providing the second measurement to the attestation service;
   receiving, from the attestation service, a second attestation state associated with the second measurement, the second attestation state the same as the first attestation state; and
   deriving, from the second attestation state, a second key configured to enable the device management agent to decrypt the encrypted data.

2. The method as recited in claim 1, further comprising:
   implementing on the computing device a policy received from a management service of an enterprise based at least in part on an indication that the device management agent is secure for use in the enterprise, the policy governing access to resources of the enterprise;
   providing to the management service an indication of a trusted platform module endorsement key of the computing device; and
   being permitted to access resources of the enterprise in response to the trusted platform module endorsement key of the computing device being included in an approved list of devices of the management service.

3. The method as recited in claim 2, wherein the resources of the enterprise comprise a collection of devices.

4. The method as recited in claim 1, further comprising:
   incrementing, each time the computing device is booted a boot counter that is a monotonic counter;
   providing a current value of the boot counter to the attestation service; and
   providing the current value of the boot counter to the management service, allowing the management service to verify the value of the boot counter provided to the attestation service is the same as the value of the boot counter provided to the management service.

5. The method as recited in claim 2, the implementing including implementing, by the device management agent, the policy received via a network if the received policy is digitally signed by the management service.

6. The method as recited in claim 2, further comprising the device management agent digitally signing the policy received from the management service and storing the digitally signed policy in a policy store of the computing device.

7. The method as recited in claim 2, wherein the enterprise comprises a collection of resources in an education setting, and the management service denies the computing device access to one or more resources of the collection of resources based on a content source or a rating of the content.

8. The method as recited in claim 2, further comprising:
   obtaining, by the device management agent, a value associated with a hardware component of the computing device;
   verifying that the obtained value is the same value as was previously provided to the trusted platform module of the computing device; and
   attesting to the management service that the hardware component is trusted by the trusted platform module in response to the obtained value being the same as was previously provided to the trusted platform module.

9. The method as recited in claim 2, further comprising:
   providing to the management service an enrollment request; and
   receiving an indication that the computing device is enrolled with the management service in response to the attestation service having verified the device management agent for use in the enterprise, the management service taking a remedial action in response to the attestation service not having verified the device management agent for use in the enterprise.

10. The method as recited in claim 5, further comprising storing the received policy that is digitally signed by the management service in a hardware policy store of the computing device, access to the hardware policy store being controlled by an operating system of the computing device.

11. The method as recited in claim 1, further comprising:
   providing the attestation state to one or more additional services in the enterprise to prove to the one or more additional services that the computing device has been verified for use in the enterprise by the attestation service, the attestation state including an indication of whether the computing device is verified by the attestation service as well as at least one of the one or more measurements.

12. The method as recited in claim 1, further comprising:
   accessing, following a second secured reboot of the computing device, a third measurement associated with the device management agent;
   providing the third measurement to the attestation service;
   receiving, from the attestation service, a third attestation state associated with the third measurement, the third attestation state different from the first attestation state and the second attestation state; and
   deriving, from the third attestation state, a third key configured to not enable the device management agent to decrypt the encrypted data.

13. A computing device comprising:
   a measurement system including a trusted platform module;
   a boot system configured to securely boot the computing device, the securely booting including generating and providing, to the measurement system, measurements reflecting a security state of the computing device and at least one module or component loaded on the computing device, the at least one module or component including a device management agent; and the device management agent configured to:
obtain, following a first secured boot of the computing device, a first set of measurements from the measurement system, the first set of measurements including a measurement associated with the first secured boot and a measurement associated with the security state of the computing device generated due to the first secured boot;
provide the first set of measurements to an attestation service;
receive, from the attestation service, a first attestation state associated with the first set of measurements, the first attestation state an indication the device management agent is secure;
derive a first key from the first attestation state;
encrypt data using the first key;
store the encrypted data on the computing device;
obtain, following a first secured reboot of the computing device, a second set of measurements from the measurement system, the second set of measurements including another measurement associated with the first secured reboot and another measurement associated with the security state of the computing device generated due to the first secured reboot;
provide the second set of measurements to the attestation service;
receive, from the attestation service, a second attestation state associated with the second set of measurements, the second attestation state the same as the first attestation state; and
derive, from the second attestation state, a second key configured to enable the device management agent to decrypt the encrypted data.

14. The computing device as recited in claim 13, further comprising a policy store comprising a hardware policy store, write access to the hardware policy store being controlled by an operating system of the computing device which enables write access by the device management agent but not by other programs running on the computing device.

15. The computing device as recited in claim 13, wherein the measurements are stored in the trusted platform module.

16. The computing device as recited in claim 13, the measurement system being further configured to increment, each time the computing device is booted, a boot counter that is a monotonic counter, the device management agent being further configured to provide a current value of the boot counter to the attestation service, and provide the current value of the boot counter to the management service, allowing the management service to verify the value of the boot counter provided to the attestation service is the same as the value of the boot counter provided to the management service.

17. The computing device as recited in claim 13, the measurement system being further configured to implement on the computing device a policy received via a network from a management service of an enterprise based at least in part on the indication that the device management agent is secure for use in the enterprise, the policy governing access to resources of the enterprise and wherein the resources of the enterprise comprise a collection of devices.

18. The computing device as recited in claim 17, the measurements further reflecting an indication that the computing device is used by one or more children, and the second instructions are further configured to provide to the management service an enrollment request, and receive an indication that the computing device is enrolled with the management service in response to the indication that the device management agent is secure for use in the enterprise, the policy received from the management service preventing the computing device from accessing content deemed objectionable by the management service.

19. The computing device as recited in claim 17, the implementing including implementing, by the device management agent, the policy received via the network if the received policy is digitally signed by the management service.

20. A computing device comprising:
one or more processors; and
one or more computer-readable storage media having stored thereon at least first and second instructions, the first instructions configured to, when executed by the one or more processors, cause the one or more processors to:
securely boot the computing device, the securely booting including generating measurements reflecting at least one module or component loaded on the computing device, the at least one module or component including the second instructions comprising a device management agent executed as a hardened program on the computing device; and
responsive to an operating system of the computing device verifying a digital signature of an operating system certificate associated with the device management agent, protect the second instructions from being injected with malicious code; and
the second instructions configured to, when executed by the one or more processors, further cause the one or more processors to:
access, following a first secured boot of the computing device, a first measurement associated with the first secured boot;
provide the first measurement to an attestation service;
receive, from the attestation service, a first attestation state associated with the first measurement, the first attestation state an indication the device management agent is secure;
derive a first key from the first attestation state;
encrypt data using the first key;
store the encrypted data on the computing device;
access, following a first secured reboot of the computing device, a second measurement associated with the first secured reboot;
provide the second measurement to the attestation service;
receive, from the attestation service, a second attestation state associated with the second measurement, the second attestation state the same as the first attestation state; and
derive, from the second attestation state, a second key configured to enable the device management agent to decrypt the encrypted data.

* * * * *